United States Patent
Metzger et al.

(10) Patent No.: US 7,796,623 B2
(45) Date of Patent: Sep. 14, 2010

(54) DETECTING AND REPORTING A LOSS OF CONNECTION BY A TELEPHONE

(76) Inventors: Michael M. Metzger, 3400 Avenue of the Arts H312, Costa Mesa, CA (US) 92626; Huan-Yu Su, 3009 Calle Frontera, San Clemente, CA (US) 92673; Armin Abold, Hansastr. 110 A. D-81373, Munich (DE)

( * ) Notice: Subject to any disclaimer, the term of this patent is extended or adjusted under 35 U.S.C. 154(b) by 0 days.

(21) Appl. No.: 12/384,019

(22) Filed: Mar. 30, 2009

(65) Prior Publication Data

US 2009/0190727 A1 Jul. 30, 2009

Related U.S. Application Data

(63) Continuation of application No. 11/262,408, filed on Oct. 28, 2005, now Pat. No. 7,532,581.

(51) Int. Cl.
*H04L 12/28* (2006.01)
*H04M 3/22* (2006.01)

(52) U.S. Cl. .................................. 370/401; 379/32.01

(58) Field of Classification Search ................ 370/401; 379/32.01

See application file for complete search history.

(56) References Cited

U.S. PATENT DOCUMENTS

| | | | | |
|---|---|---|---|---|
| 5,920,611 | A | 7/1999 | Howell | 379/35 |
| 6,570,855 | B1 | 5/2003 | Kung et al. | 370/237 |
| 7,218,895 | B1 | 5/2007 | Raghavan | 455/67.13 |
| 7,286,467 | B1 | 10/2007 | Sylvain | 370/216 |
| 2002/0141392 | A1 | 10/2002 | Tezuka et al. | 370/352 |
| 2002/0172209 | A1 | 11/2002 | Ohta et al. | 370/401 |
| 2003/0095542 | A1 | 5/2003 | Chang et al. | 370/352 |
| 2004/0005151 | A1 | 1/2004 | Pitchforth | 398/37 |
| 2004/0141392 | A1 | 7/2004 | Lee et al. | 365/200 |
| 2004/0247112 | A1 | 12/2004 | Lee et al. | 379/414 |
| 2005/0059381 | A1* | 3/2005 | Hintermeister et al. | 455/412.1 |
| 2005/0117594 | A1 | 6/2005 | Ryan | 370/401 |
| 2005/0193225 | A1* | 9/2005 | Macbeth et al. | 714/2 |
| 2006/0023686 | A1* | 2/2006 | Jeong et al. | 370/338 |
| 2006/0085548 | A1* | 4/2006 | Maher et al. | 709/227 |
| 2006/0229093 | A1* | 10/2006 | Bhutiani et al. | 455/518 |
| 2006/0277051 | A1 | 12/2006 | Barriac et al. | 704/503 |
| 2007/0121859 | A1* | 5/2007 | Smelyansky et al. | 379/158 |
| 2007/0127391 | A1 | 6/2007 | Goodman | 370/252 |
| 2008/0140427 | A1* | 6/2008 | Rambo et al. | 704/500 |
| 2009/0143050 | A1* | 6/2009 | Ignatin | 455/414.1 |

* cited by examiner

*Primary Examiner*—Andrew Lee

(57) ABSTRACT

There is provided a method of detecting and reporting poor voice quality for use by a gateway device. The method comprises facilitating a connection between a telephone and a remote telephone via a network, and detecting a poor voice quality indictor during the connection. The method further comprises capturing, for a pre-determined period of time, telephone voice data being exchanged between the gateway and the telephone, network voice data being exchanged between the gateway and the network, and gateway parameters. The method also comprises packetizing the telephone voice data, the network voice data and the gateway parameters into a plurality packets having a network address of a network storage, and transmitting the plurality packets destined for the network storage via the network. In one aspect, the poor voice quality indictor may be generated by a user of the telephone in response to a poor voice quality of the connection.

2 Claims, 5 Drawing Sheets

DETECTING AND REPORTING A LOSS OF CONNECTION BY A TELEPHONE

The present application is a Continuation of U.S. application Ser. No. 11/262,408, filed Oct. 28, 2005 now U.S. Pat. No. 7,532,581.

BACKGROUND OF THE INVENTION

1. Field of the Invention

The present invention relates generally to voice quality monitoring and reporting. More particularly, the present invention relates to detecting poor voice quality indicator at a gateway, and capturing and reporting voice data for analysis.

2. Background Art

Subscribers use speech quality as the benchmark for assessing the overall quality of a telephone network. An effective troubleshooting procedure is a key to maintaining and improving perceived voice quality.

Almost every telephone user has experienced calls with undesirable amounts of static, echo, intermittent interruptions, and the like. In such events, telephone users take one of several actions. If such problems occur less frequently, telephone users may learn to ignore such problems when they do occur, by simply disconnecting the problematic call and initiating a new call. If such problems occur more frequently, telephone users may switch to different telephone carriers in the hopes of experiencing a superior voice quality with a new carrier. In addition, some telephone users may report such problems to their carrier.

However, even if such problems are reported to the carriers, today, the carriers have no ability to capture and analyze the voice data to determine the source of the reported problems in real-time to provide a remedy. In the event that such problems are reported frequently, the carriers dispatch field engineers to the central office in order to capture the voice data for analysis. This type of troubleshooting, however, is quite expensive and time consuming, because it may take several days before such problems reoccur and the voice data are simultaneously and properly captured at the time such problems reoccur.

FIG. 1 illustrates a conventional telephone network, where telephone 105 is in communication with gateway VoIP device 110 at the edge of the network in the central office. Gateway VoIP device 110 includes CODECs (Coders and Decoders) for digitizing and speech encoding/decoding of the digitized data for transmission over IP network 115 for communication with telephone 120. In order to detect voice quality problems, field engineers are typically dispatched to the central office to obtain voice or speech data from gateway VoIP device 110 for simulation and analysis. Once in the central office, the field engineers must set up their test equipment, make wire connections to gateway VoIP device 110, configure gateway VoIP device 110 in diagnostics mode, and hope for the problems to reoccur sooner than later.

Since field engineers do not possess all the necessary equipment for simulation and analysis of the voiced data, such data must be transmitted to the engineering support centers for simulation and analysis. Once such data are simulated and analyzed, the engineering support centers may require additional data to be captured by the field engineers in order to pinpoint the source of such problems. Therefore, it may take several weeks or months to determine the source of a problem and provide a remedy for problems that occur frequently in the network. Even more, the time and expense associated with discovering voice quality problems may not allow troubleshooting for less frequent voice quality problems.

Accordingly, there is a need in the art for real-time reporting of voice quality problems, and monitoring, capturing and reporting of voice data for simulation and analysis to discover the source of the problems and provide a remedy.

SUMMARY OF THE INVENTION

There are provided methods and systems for detecting and reporting poor voice quality for use by a gateway device in communication with a telephone and a network. An example method comprises facilitating a connection between the telephone and a remote telephone via the network; detecting a poor voice quality indictor during the connection; capturing, for a pre-determined period of time, telephone voice data being exchanged between the gateway and the telephone, network voice data being exchanged between the gateway and the network, and gateway parameters; packetizing the telephone voice data, the network voice data and the gateway parameters into a plurality packets having a network address of a network storage; and transmitting the plurality packets destined for the network storage via the network.

In one aspect, the detection of the poor voice quality indictor includes receiving the poor voice quality indictor from the telephone. In a further aspect, the poor voice quality indictor is generated by a user of the telephone in response to a poor voice quality of the connection. Yet, in another aspect the poor voice quality indictor is generated by the telephone in response to the telephone calculating parameters indicative of a poor voice quality of the connection.

In an additional aspect, the poor voice quality indictor is generated by the gateway in response to the gateway calculating parameters indicative of a poor voice quality of the connection, where the parameters include speech coding parameters calculated by the gateway.

In a further aspect, the poor voice quality indictor further indicates a type and a severity of a poor voice quality of the connection, where the pre-determined period of time is determined based on the type and the severity of the poor voice quality of the connection.

In a separate aspect, there is provided a method of detecting and reporting a loss of connection for use by a telephone, where the method comprises establishing a connection with a remote telephone; monitoring for the loss of connection after the establishing the connection; determining that the loss of connection has occurred; and generating at least one of a voice message, an audible sound or a vibration in response to determining the loss of connection to alert the user of the loss of connection. The method may further comprise detecting a voice activity of the user after the loss of connection, where the generating occurs only after the detecting of the voice activity of the user.

Other features and advantages of the present invention will become more readily apparent to those of ordinary skill in the art after reviewing the following detailed description and accompanying drawings.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
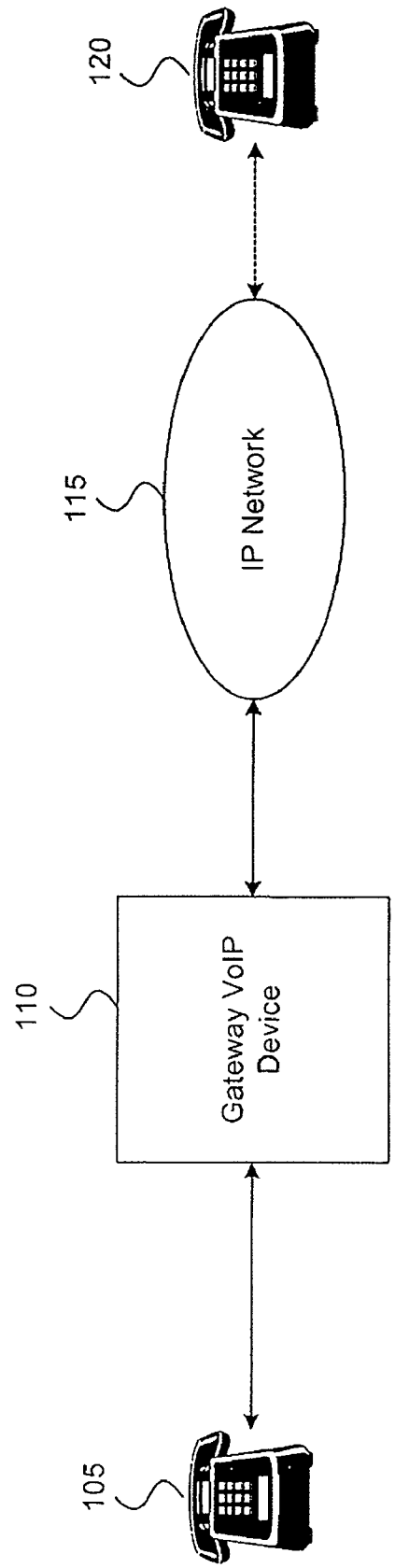
FIG. 1 illustrates a block diagram of a conventional telephone network.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

Figure 2:
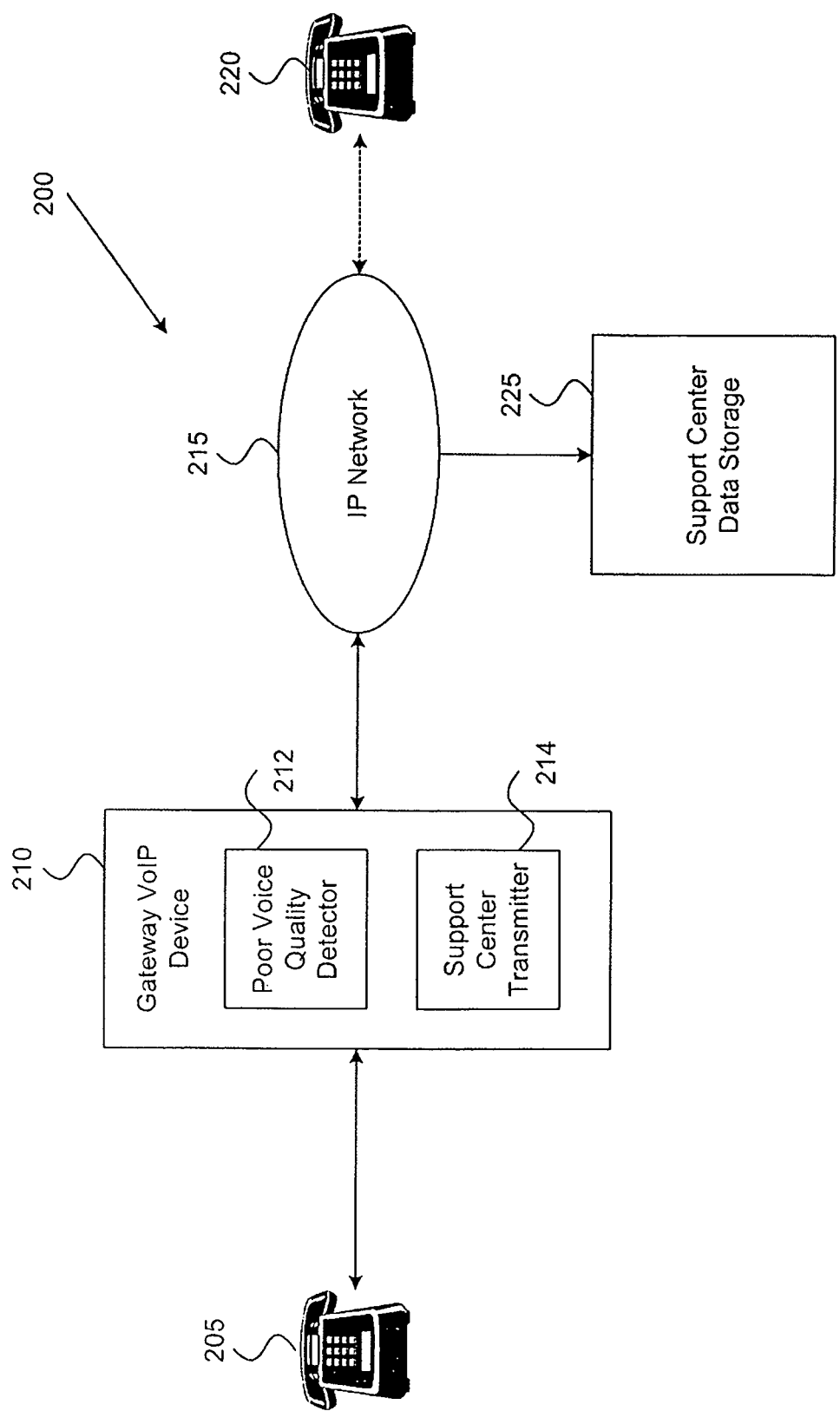
FIG. 2 illustrates a block diagram of telephone network, according to one embodiment of the present invention.

FIG. 2 illustrates a block diagram of telephone network 200, according to one embodiment of the present invention. As shown, telephone 205 is in communication with gateway VoIP device 210 at the edge of IP network 215. As described above, gateway VoIP device 210 includes CODECs for digitizing voice signals received from telephone 205 and encoding the digitized voice signals using a speech compression technique for transmission over IP network 215. The speech compression techniques are well known in the art and are beyond the scope of the present application. Such speech compression techniques are described in various standards, such as G.723.1, G.711, G.729, Selectable Mode Vocoder (SMV), etc. Further, CODECs receive encoded digitized voice signals over IP network 215 for decoding and generating voice signals for transmission to telephone 205.

As shown in FIG. 2, gateway VoIP device 210 includes poor voice quality detector 212 and support center transmitter 214. As explained below in conjunction with FIGS. 3-5, poor voice quality detector 212 may detect poor voice quality in a variety ways. For example, poor voice quality detector 212 may receive an indication of poor voice quality from the user of telephone 205 or from the operator of IP network 215. As additional examples, poor voice quality detector 212 may monitor the voice quality at gateway VoIP device 210 by analyzing certain speech coding parameters and network parameters, or the voice quality may be monitored by telephone 205 and reported to poor voice quality detector 212 or the operator of IP network 215.

Once poor voice quality detector 212 detects a poor voice quality indicator, poor voice quality detector 212 captures voice data from input and output lines of gateway VoIP device 210 on IP network 215 side and voice data from input and output lines of gateway VoIP device 210 on telephone 205 side, and controlling and configuration parameters of gateway VoIP device 210. The captured voice data and parameters may be captured for a pre-determined period of time. The pre-determined period of time may be provided by the network operator in real-time or when gateway VoIP device 210 is first configured. Support center transmitter 214 packetizes the captured voice data and parameters into a number of IP frames for transmission over IP network 215 to an IP address associated with support center data storage 225. The IP address may be a pre-determined IP address or an IP address provided by the network operator in real-time or when gateway VoIP device 210 is first configured. Support center data storage 225 includes a memory for storing the incoming data, which may be depacketized and analyzed to determine sources of the problems and to provide remedies therefor.

Figure 3:
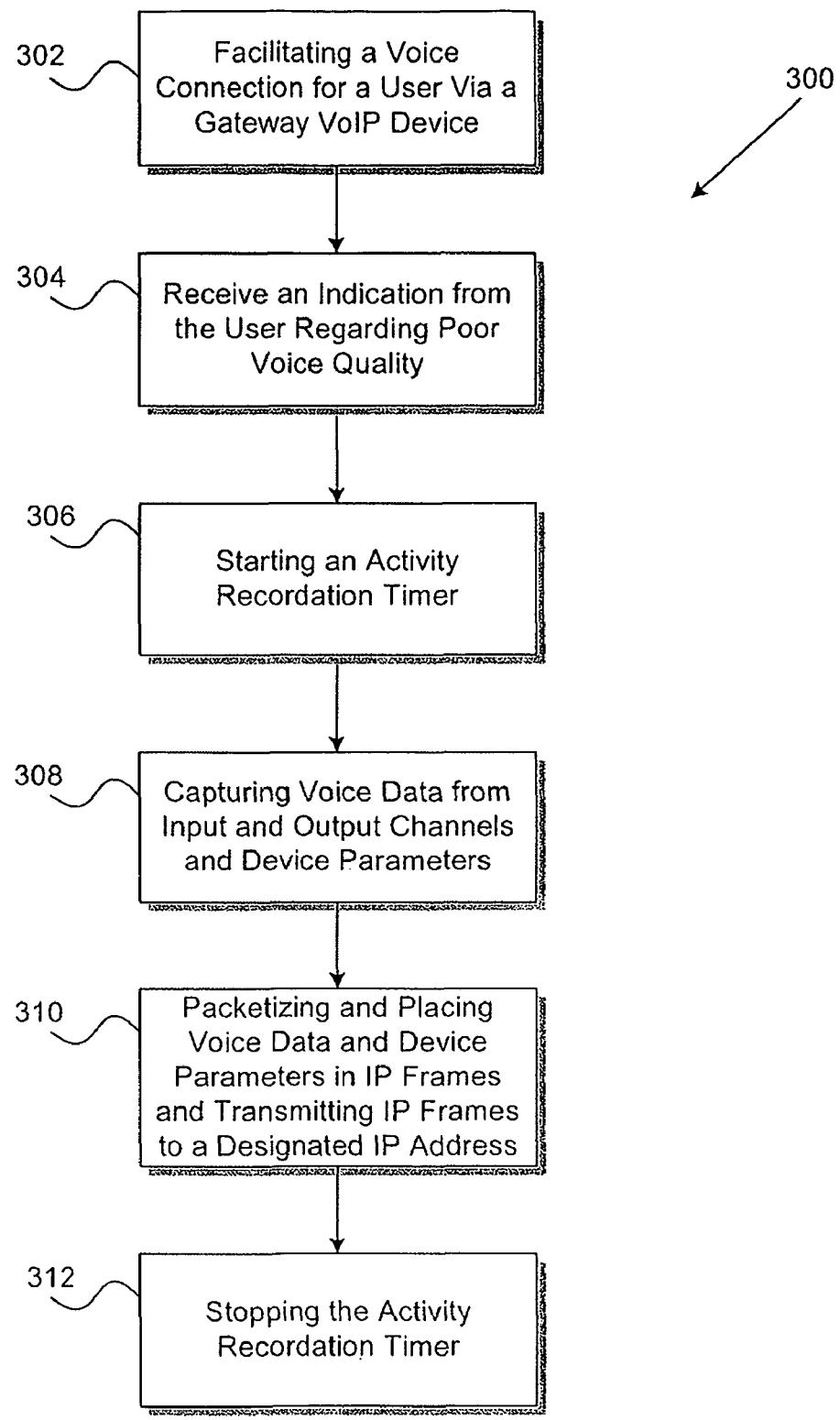
FIG. 3 illustrates a voice quality flow diagram for use in conjunction with the telephone network of FIG. 2.

FIG. 3 illustrates voice quality flow diagram 300 for use in conjunction with telephone network 200 of FIG. 2. At step 302, gateway VoIP device 210 facilitates a voice channel or connection for use by telephone 205 for voice communications over IP network 215. During the connection, the user of telephone 205 may experience voice quality problems, such as intermittent static, echo, noise, weak voice, etc. In such event, the user of telephone 205 causes telephone 205 to transmit a poor voice quality indicator to gateway VoIP device 210. To this end, the user may press a pre-programmed button on telephone 205 or may press a number of buttons in a specific sequence to generate the poor voice quality indicator or a number of tones corresponding to the pressed button for transmission to gateway VoIP device 210. For example, in one embodiment, the user may press "#0#" or a button that is programmed to generate such sequence, during the connection, to transmit a sequence of tones. Such sequence of tones may be detected by gateway VoIP device 210 directly or indirectly (if detected by the network operator and reported to gateway VoIP device 210.) In one embodiment, the poor voice quality indicator may be generated by the user prior to or at the time of making the call, such that capturing of the voice data and parameters and reporting is enabled at the start of the next call.

It should be noted that various techniques could be used for reporting and detecting the poor voice quality without departing from the scope of the present invention. For example, telephone 205 may transmit a modulated signal or a data packet, rather than a series of tones to report the poor voice quality. Further, in one embodiment, the poor voice quality indicator may indicate a type, such as noise, echo, etc., and a severity of the problem based on the information provided by the user. For example, the user may follow the above sequence by a digit between 1 and 9, such as pressing "#0#1" for the lowest severity and "#0#9" for the highest severity.

At step 306, once poor voice quality detector 212 of gateway VoIP device 210 detects the poor voice quality indicator from telephone 205 or the network operator, poor voice quality detector 212 starts an activity recordation timer for a pre-determined period of time for capturing voice data and parameters. As stated above, the pre-determined period of time may be provided by the network operator in real-time or when gateway VoIP device 210 is first configured. Further, the pre-determined period of time may vary depending on the problem or its severity.

At step 308, poor voice quality detector 212 captures voice data from input and output lines of gateway VoIP device 210 on IP network 215 side and voice data from input and output lines of gateway VoIP device 210 on telephone 205 side, and controlling and configuration parameters of gateway VoIP device 210. Next, at step 310, support center transmitter 214 packetizes the captured voice data and parameters and them into a number of IP frames for transmission over IP network 215 to an IP address associated with support center data storage 225. As explained above, the IP address may be a pre-determined IP address or an IP address provided by the network operator in real-time or when gateway VoIP device 210 is first configured. At step 312, poor voice quality detector 212 monitors the activity recordation timer and stops capturing voice data and parameters, and transmission of packetized voice data and parameters to support center data storage 225, when the activity recordation timer expires.

Figure 4:
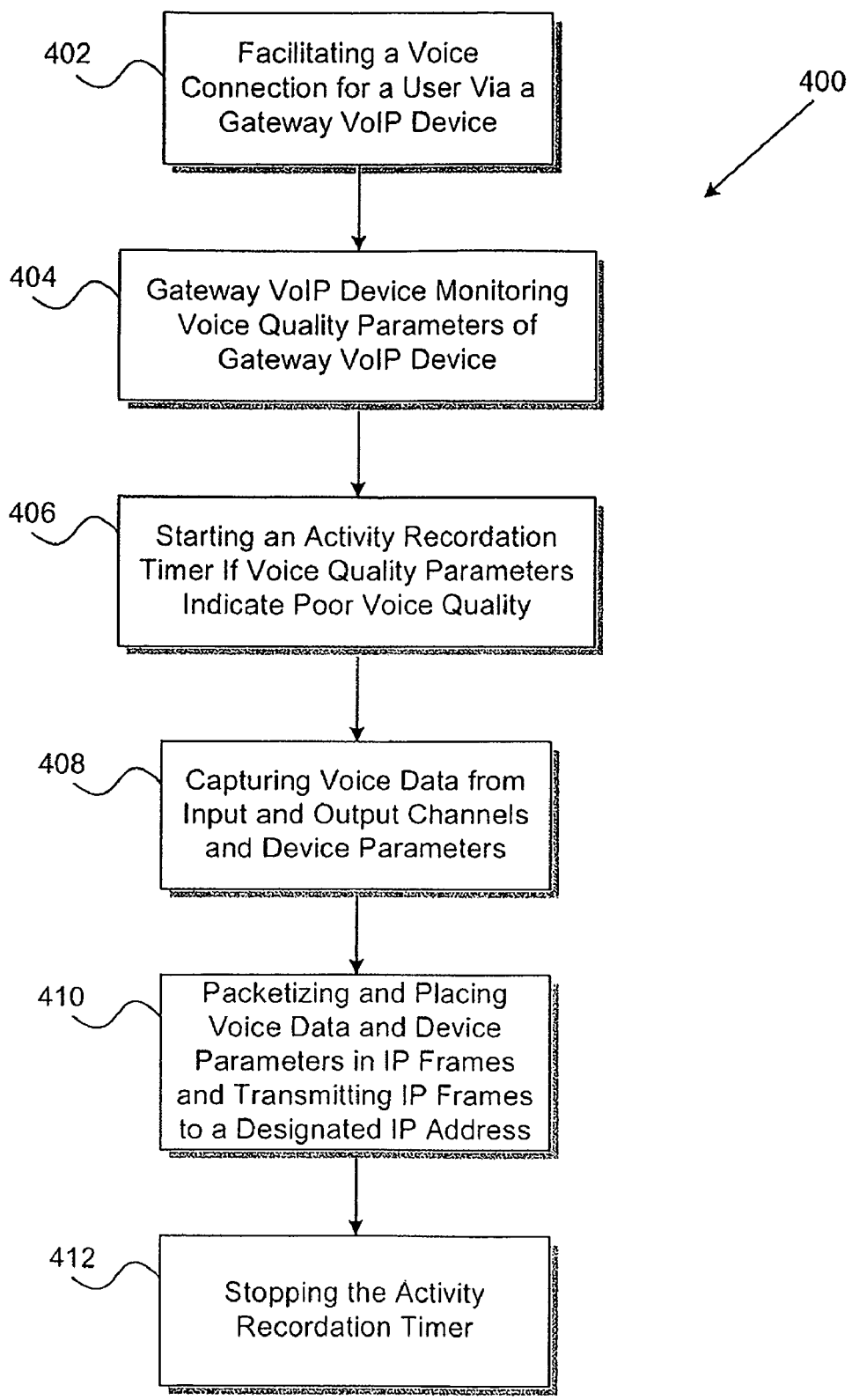
FIG. 4 illustrates a voice quality flow diagram for use in conjunction with the telephone network of FIG. 2.

FIG. 4 illustrates voice quality flow diagram 400 for use in conjunction with telephone network 200 of FIG. 2. At step 402, gateway VoIP device 210 facilitates a voice channel or connection for use by telephone 205 for voice communications over IP network 215. At step 404, during the connection, poor voice quality detector 212 may monitor certain parameters of gateway VoIP device 210 to determine the voice quality. For example, the parameters may indicate excessive noise, echo and low level of voice and fluctuations that cannot be completely remedied by gateway VoIP device 210. One such parameter can be the bulk delay parameter for echo cancellation. For example, if the bulk delay parameter indicates that the bulk delay is changing beyond a reasonable range, poor voice quality detector 212 may indicate a poor voice quality. Further, if noise parameters of gateway VoIP device 210 indicate an excessive amount of noise, poor voice quality detector 212 may also indicate a poor voice quality.

At step 406, once poor voice quality detector 212 of gateway VoIP device 210 indicates the poor voice quality, poor voice quality detector 212 starts an activity recordation timer for a pre-determined period of time for capturing voice data and parameters. As stated above, the pre-determined period of time may be provided by the network operator in real-time or when gateway VoIP device 210 is first configured. Further, the pre-determined period of time may vary depending on the problem or its severity. Steps 408-412 of voice quality flow diagram 400 correspond to steps 308-312 of voice quality flow diagram 300, respectively, where voice data and parameters are captured and transmitted to support center data storage 225 until the activity recordation timer expires.

Figure 5:
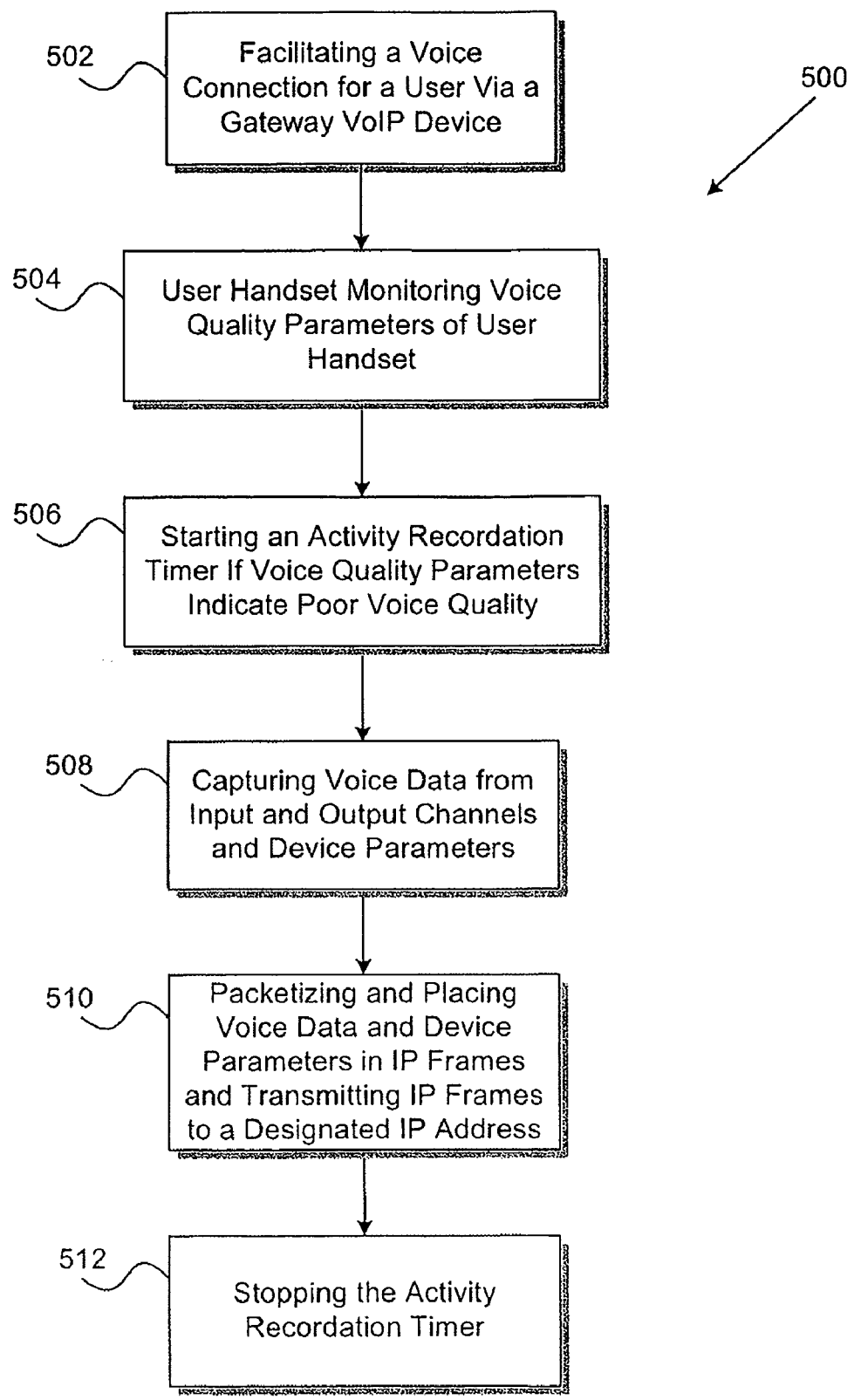
FIG. 5 illustrates a voice quality flow diagram for use in conjunction with the telephone network of FIG. 2.

FIG. 5 illustrates voice quality flow diagram 500 for use in conjunction with telephone network 200 of FIG. 2. At step 502, gateway VoIP device 210 facilitates a voice channel or connection for use by telephone 205 for voice communications over IP network 215. Next, at step 504, during the connection, telephone 205 may monitor certain parameters of telephone 205 to determine voice quality problems, such as intermittent static, echo, noise, weak voice, etc. In such event, telephone 205 may transmit a poor voice quality indicator to gateway VoIP device 210. The poor voice quality indicator may be as described in conjunction with step 304 of voice quality flow diagram 300 of FIG. 3. In one embodiment, after step 502, telephone 205 may determine the connectivity status of telephone 205 during the connection. If telephone 205 determines that the connection has been lost, telephone 205 may generate a voice message, an audible tone or a vibration to indicate a loss of connection. Such voice message, audible tone or vibration can alert a user of telephone 205 that the call has been lost, so he does not continue speaking after such loss of connection when the remote party is unable to receive the voice. This mode of operation is especially useful for wireless telephone applications. In addition, in some embodiments, telephone 205 may include a voice activity detection (VAD) to generate the voice message, audible tone or vibration only when the VAD detects the user's voice after the connection has been lost.

At step 506, once poor voice quality detector 212 of gateway VoIP device 210 detects the poor voice quality indicator directly from telephone 205 or indirectly from the network operator, poor voice quality detector 212 starts an activity recordation timer for a pre-determined period of time for capturing voice data and parameters. As stated above, the pre-determined period of time may be provided by the network operator in real-time or when gateway VoIP device 210 is first configured. Further, the pre-determined period of time may vary depending on the problem or its severity. Steps 508-512 of voice quality flow diagram 500 correspond to steps 308-312 of voice quality flow diagram 300, respectively, where voice data and parameters are captured and transmitted to support center data storage 225 until the activity recordation timer expires.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, the present invention may be utilized by a PBX (Private Business eXchange) in an enterprise environment, in addition to the Central Office. Further, handsets or telephones of the present invention may or may not use VoIP, and may communicate through wireline or wireless networks. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method performed by a telephone for detecting and reporting a loss of connection, the method comprising:
   establishing a connection with a remote telephone;
   monitoring for the loss of connection after the establishing the connection;
   determining that the loss of connection has occurred;
   detecting a voice activity of the user after the loss of connection;
   generating, in response to detecting the voice activity, at least one of a voice message, an audible sound or a vibration in response to determining the loss of connection to alert the user of the loss of connection.

2. A telephone for detecting and reporting a loss of connection, the telephone configure to:
   establish a connection with a remote telephone;
   monitor for the loss of connection after the establishing the connection;
   determine that the loss of connection has occurred;
   detect a voice activity of the user after the loss of connection;
   generate, in response to detecting the voice activity, at least one of a voice message, an audible sound or a vibration in response to determining the loss of connection to alert the user of the loss of connection.

* * * * *